March 26, 1957   J. M. McDONNELL ET AL   2,786,455
FLUID MOTOR

Filed Jan. 4, 1954   3 Sheets-Sheet 1

INVENTORS
JOSEPH M. McDONNELL
BY HENRY D. MOWERS

Craig V. Morton
ATTORNEY

March 26, 1957  J. M. McDONNELL ET AL  2,786,455
FLUID MOTOR
Filed Jan. 4, 1954  3 Sheets-Sheet 2

INVENTORS
JOSEPH M. McDONNELL
BY HENRY D. MOWERS

Craig V. Morton
ATTORNEY

INVENTORS
JOSEPH M. McDONNELL
BY HENRY D. MOWERS

Craig V. Morton
ATTORNEY

United States Patent Office 2,786,455
Patented Mar. 26, 1957

2,786,455

FLUID MOTOR

Joseph Martin McDonnell, Rochester, and Henry D. Mowers, Spencerport, N. Y., assignors to General Motors Corporation, Detroit, Mich., a corporation of Delaware Application January 4, 1954, Serial No. 401,909

12 Claims. (Cl. 121—97)

This invention pertains to fluid pressure operated motors, and particularly to fluid motors adapted for actuating oscillatable windshield wipers.

The use of fluid motors for actuating windshield wipers is quite common. However, the majority of such motors are of the suction operated type, rather than of the pressure type. This invention relates to a motor of the latter type, and may be operated by any suitable fluid medium under pressure, be it a liquid or a gas. Accordingly, among our objects are the provision of a fluid motor having valve means controlled by movement of the piston thereof; the further provision of a fluid motor constructed and arranged to move wiper blades throughout a normal wiping range and to a parked position beyond the normal wiping range including means for reducing the abruptness of movement reversals; and the still further provision of means for controlling the speed of motor operation.

The aforementioned and other objects are accomplished in the present invention by providing a fluid motor assembly with a pair of mechanically actuated pilot valves and a servo-actuated directional valve. Specifically, the motor assembly includes a housing having a substantially semi-cylindrical cylinder. An oscillatable vane piston is disposed within the cylinder for movement in either direction under the urge of fluid pressure. The housing also encloses a valve assembly comprising a pair of mechanically actuated pilot valves, a servo actuated directional valve, and a manually operable control valve.

The pilot valves are operatively associated with the vane piston, the pilot valves being located at opposite ends of the cylinder and adapted to be engaged by the piston adjacent each end of its stroke. Each pilot valve controls fluid connections to the servo actuated directional valve, which, in turn, controls the application of pressure fluid to opposite chambers of the cylinder so as to maintain the vane piston in a state of continuous oscillatory movement. The application of pressure fluid by the servo actuated valve is, in turn, controlled by the manually operable valve, which includes means for throttling the drain of fluid from the motor cylinder so as to control the speed of piston movement. The manual control valve also includes means for enabling the vane piston to be moved to a parked position, and concurrently therewith latches the servo actuated valve in position to prevent piston movement in the reverse direction.

In operation, the operator need only actuate the manual control valve so as to select the desired speed of operation. Continuous oscillatory movement of the vane piston will then be controlled and maintained by actuation of the pilot valves and the servo actuated valve. When the manual control valve is moved to the "off" position, the wiper blades will automatically be moved beyond their normal wiping strokes to a parked position, and remain at such position under the urge of fluid pressure acting on one surface of the vane piston.

Further objects and advantages of the present invention will be apparent from the following description, reference being had to the accompanying drawings wherein a preferred embodiment of the present invention is clearly shown and wherein similar reference characters denote similar parts throughout the several views.

Figure 1:
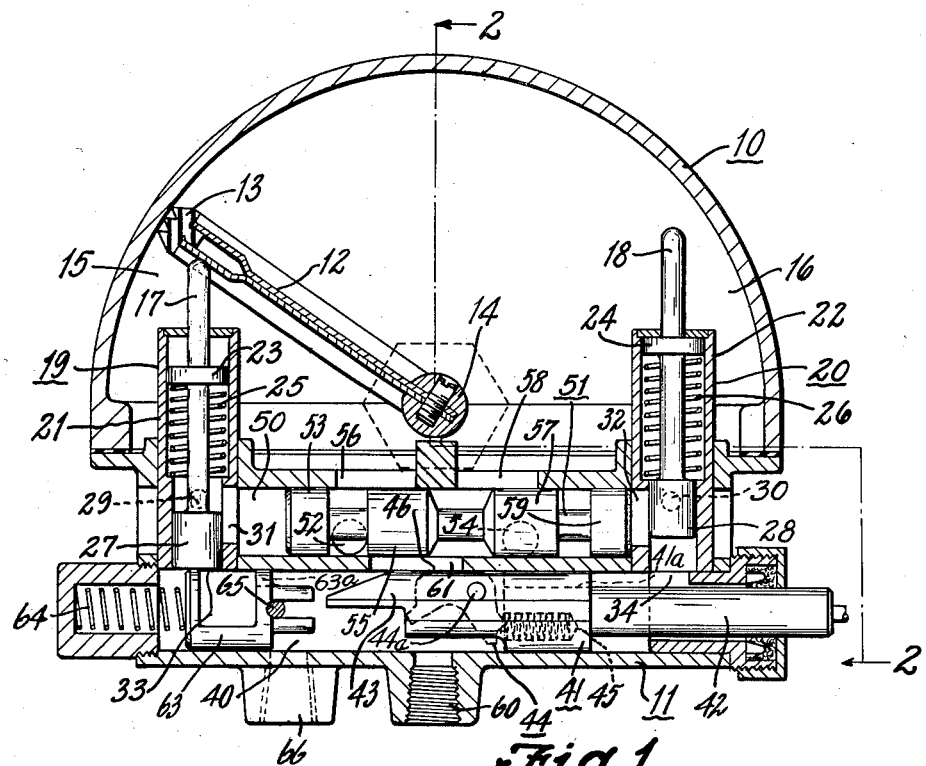
Fig. 1 is a sectional view of the fluid motor assembly of this invention with the vane piston at one end of its normal wiping stroke.
Figures 2, 3:
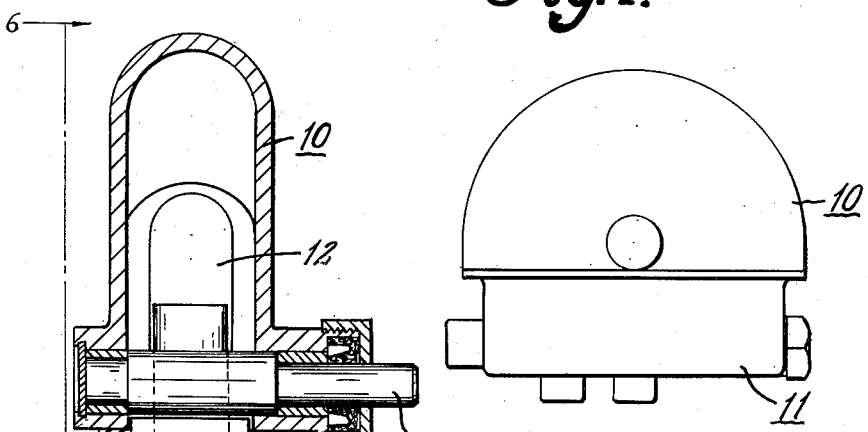
Fig. 2 is a sectional view taken along line 2—2 of Fig. 1.
Fig. 3 is a view, in elevation, of the motor assembly of this invention.

With particular reference to Fig. 3, the motor assembly is shown including a housing portion 10, which constitutes the cylinder, and a housing portion 11, which constitutes the valve casing. The cylinder housing 10 is of semi-cylindrical shape, as is apparent from an inspection of Fig. 3. With particular reference to Fig. 1, it may be seen that a vane piston 12 having suitable sealing means 13 is attached to a rotatable shaft 14 within the cylinder housing 10. The shaft 14 is supported for rotation within the housing 10 by any suitable bearing means, as shown in Fig. 2.

Figure 4:
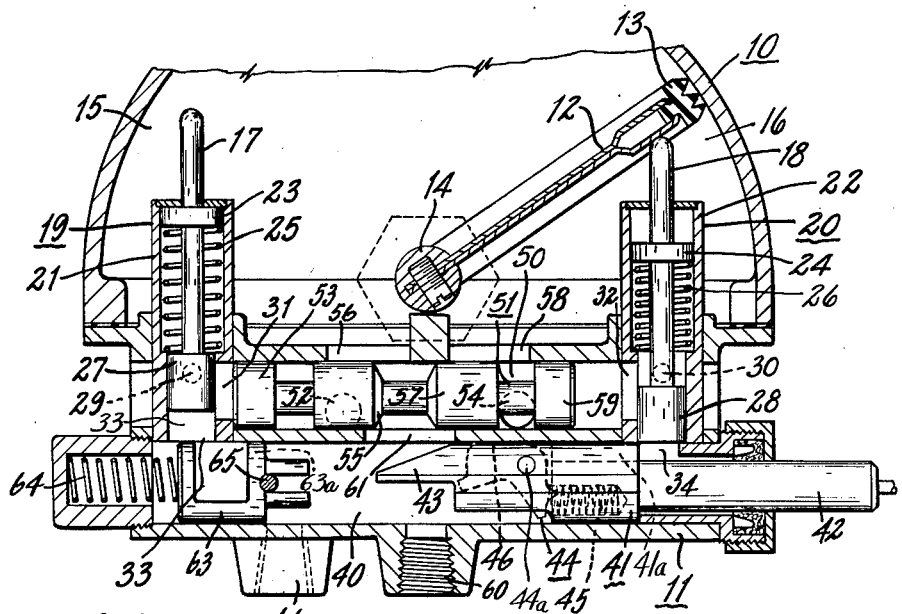
Fig. 4 is a fragmentary view similar to Fig. 1 with the vane piston at the other end of its normal wiping stroke.
Figure 7:
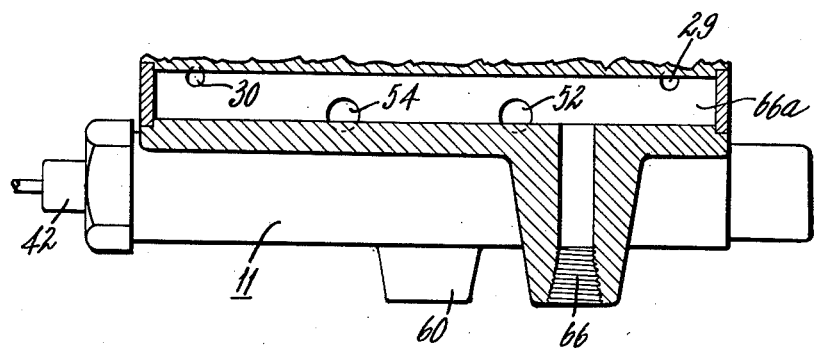
Fig. 7 is a fragmentary view, partly in section and partly in elevation, taken along line 7—7 of Fig. 2.

The vane piston 12 divides the cylinder into two chambers 15 and 16, the vane piston being capable of oscillatory movement in both directions under the urge of fluid pressure. From an inspection of Figs. 1 and 4, it may further be seen that the vane piston 12 is arranged to engage plungers 17 and 18, respectively, adjacent opposite ends of its normal wiping stroke. The plunger 17 constitutes part of a pilot valve indicated generally by the numeral 19, and the plunger 18 constitutes a component part of a pilot valve, designated generally by the numeral 20. The pilot valve 19 includes a housing 21 within which the plunger 17 is adapted for reciprocal movement. The plunger 17 includes a flanged portion 23, which functions as a seat for one end of a coil spring 25, and a valve land 27. The valve housing 21 is formed with an inlet pressure port 29, a control port 31 and a drain port 33. The drain port 33 communicates with the bore 40 through a slot 63a in member 63, as shown in Fig. 7, the bore 40 having communication with drain port 60. The spring 25 normally urges the plunger 17 in an upward direction so that flange 23 engages the end wall of the housing 21, as is depicted in Fig. 4.

In a similar manner, the pilot valve 20 includes a housing 22 within which the plunger 18 is disposed for reciprocal movement. The plunger 18, likewise, includes a flange 24 which constitutes a seat for one end of a coil spring 26. The plunger 18 also includes a valving land 28, and the housing 22 is formed with a pressure supply port 30, a control port 32 and a drain port 34. The drain port 34 communicates with the bore 40 and the drain port 60 through communicating slots 41a and 41b in the manual control valve 41, as shown in Fig. 7. The spring 26 normally urges the plunger 18 in an upward direction so that flange 24 engages the end wall of housing 22, as is depicted in Fig. 1.

The ports 31 and 32 communicate with opposite ends of a bore 50 formed within the valve housing 11. A reciprocable valve 51 is disposed within the bore 50, the valve 51 being capable of fluid pressure actuation in both directions. Hereinafter, the valve 51 will be termed a directional valve. The valve 51 includes a plurality of spaced lands 53, 55, 57 and 59, which lands are separated by annular channels, or waist areas. The bore 50 is also formed with a pair of spaced pressure supply ports 52 and 54, and a pair of spaced control ports 56 and 58. Control port 56 communicates with cylinder chamber 15 while control port 58 communicates with cylinder chamber 16. Pilot valve 19 is operable to control the application and drain of pressure fluid to and from the end of bore 50 adjacent the valve land 53, and pilot valve 20 is operable to control the application and drain of pressure fluid to and from the end of bore 50 adjacent the valve land 59. Accordingly, it will be appreciated that the pilot valves 19 and 20 will control the position of the directional valve 51 so as to maintain the vane piston 12 in a state of continuous oscillation during motor operation.

Figure 5:
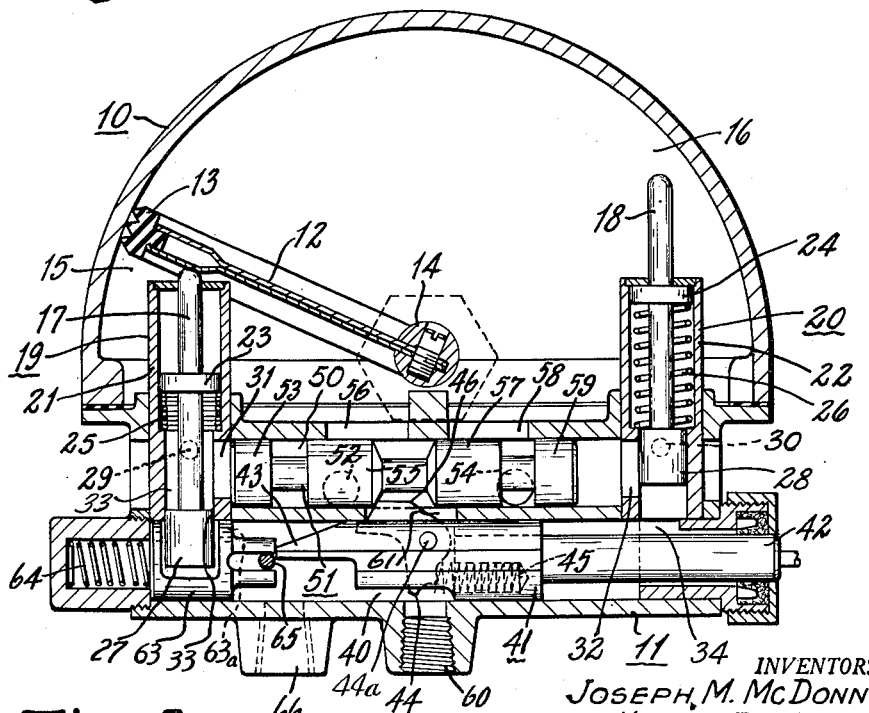
Fig. 5 is a view similar to Fig. 1 with the vane piston in the parked position beyond one end of its normal wiping stroke.
Figure 6:
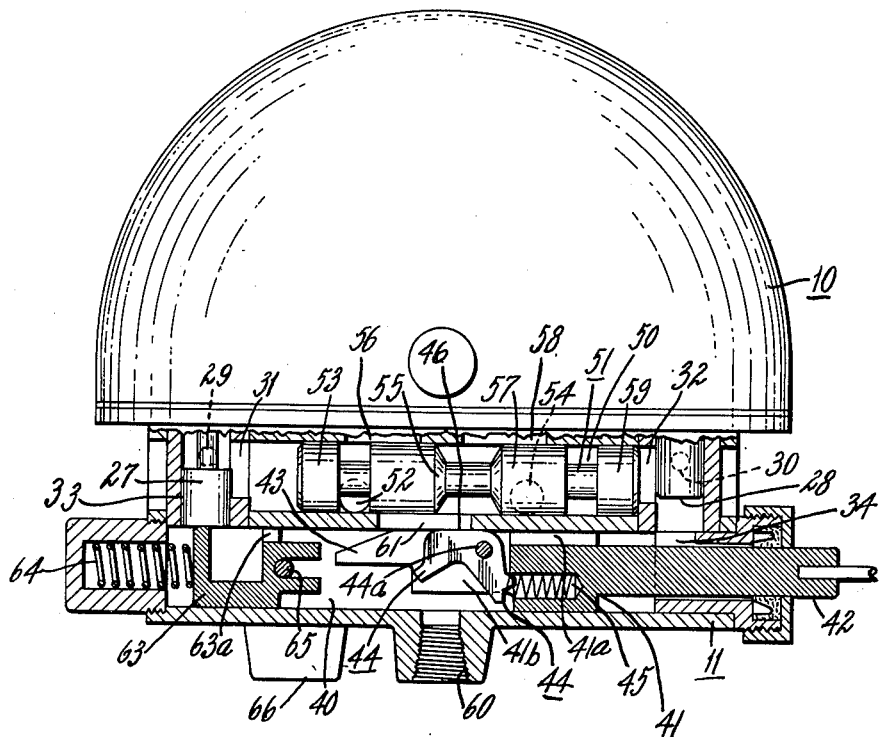
Fig. 6 is a view, partly in section and partly in elevation, taken along line 6—6 of Fig. 2.

The valve housing 11 includes a second bore 40 within which a manual control valve 41 is disposed for reciprocal movement. The manual control valve is shown integral with a control road 42, which may be attached to any suitable mechanical linkage having connection with a knob on the dashboard of a vehicle, not shown. The manual control valve 41 is formed with a tapered end portion 43, which constitutes a throttle means for the drain passage, or port 60. The valve 41 also carries a pawl 44, supported by a pivot 44a within slot 41b of the valve 41. The pawl 44 is urged in a clockwise direction, as viewed in Fig. 7, by means of a valve carried compression spring 45. The pawl 44 includes a cam portion 46, so that when the valve 41 is moved to the right, as viewed in Fig. 4, the pawl will be moved in a counterclockwise direction. However, when the control valve 41 is moved to the "off" position, as shown in Fig. 5, the end thereof will project through drain port 61 of the bore 50, as shown in Fig. 5, and engages the end surface of land 55 to latch the valve 51 in position, as will be more particularly described hereinafter.

The bore 50 also has disposed therein a grooved member 63, which is normally urged against a stop pin 65, as shown in Fig. 1, by means of a coil spring 64. However, when the manual control valve 41 is moved to the "off" position, as shown in Fig. 5, the tapered end portion 43 thereof will engage the member 63 so as to move it to the left whereupon the member 63 will receive land 27 of plunger 17. In this manner, the plunger 17 may be depressed to a greater extent by vane piston 12 so as to increase the amplitude of oscillation imparted to shaft 14 in order to facilitate parking of the wiper blades, not shown, beyond the normal wiping stroke. The valve housing 11 also includes a pressure supply port 66, which is interconnected by a passage 66a with the several valve supply ports 29, 30, 52 and 54 as depicted in Fig. 8.

Operation

The motor operates as follows. With the control valve 41 in the position of Figs. 1 and 4, pressure fluid will be applied through port 66 and passage 66a, to each of the pressure ports 29, 30, 52 and 54. Assuming the vane piston 12 to be in the position of Fig. 1, it will be seen that pressure fluid is applied to chamber 15 of the cylinder from port 52, through the annular channel between lands 53 and 55 and through port 56. At the same time, chamber 16 is connected to drain through port 58, the annular channel between lands 55 and 57, the port 61, the bore 40 and the drain port 60. At this time, land 57 blocks pressure port 54, and the servo actuated directional valve 51 is maintained in the position shown in Fig. 1 by application of pressure fluid from port 29 through port 31 of the pilot valve 19. Accordingly, the vane piston 12 will swing in a clockwise direction from the position of Fig. 1 to the position of Fig. 4, at which time, plunger 18 of the pilot valve 20 will be depressed so as to apply pressure fluid to the bore 50 adjacent the end of land 59. At this time, the other end of bore 50 will be connected to drain through port 31 and port 33, by reason of the spring 25 urging the plunger 17 upwardly as soon as the vane piston 12 moves out of engagement therewith. Accordingly, the directional valve 51 will be actuated to move from the position of Fig. 1 to the position of Fig. 4, whereupon pressure fluid is applied to cylinder chamber 16 while cylinder chamber 15 is connected to drain. In this manner, the vane piston 12 is maintained in a state of continuous oscillation, the speed thereof being controlled by the position of the manual valve 41 with reference to the drain port 61. Thus, in Fig. 1, the manual control valve 41 is positioned to throttle the drain flow through port 61 and thereby reduce the speed of piston movement, whereas, in Fig. 4, the drain flow is not throttled.

When it is desired to interrupt operation of the motor and park the wiper blades, not shown, the operator merely moves the control valve 41 to the position of Fig. 5, at which time, the vane piston 12 will be moved to the parked position and retained at such position by pressure fluid. Thus, as is shown in Fig. 5, the valve carried pawl 44 will engage the valve land 55 so as to prevent movement of the valve 51 to the right, as viewed in Fig. 5. Simultaneously therewith, the member 63 will be moved to the left by the valve 41 so that the plunger 17 may be further depressed to permit the amplitude of oscillation imparted to the shaft 14 to be increased by substantially 10°. The vane piston 12 will be retained in the parked position by the continued application of pressure fluid from port 66 through port 54 to cylinder chamber 16.

In order to resume wiper operation, it is only necessary to move the control valve plunger to the right, as viewed in Fig. 5, to the position shown in either Fig. 1 or 4, whereupon the directional valve 51 will be freed for movement and the member 63 will be moved to the right so as to limit the depression of valve plunger 17 by the vane piston.

The pilot valve springs 25 and 26 also perform another very important function, namely that of preventing abrupt reversals in vane piston movement. This feature tends to prevent over travel of the wiper blades at the end of their wiping strokes, and the objective is realized by reason of the fact that as the vane piston engages the pilot valve plungers, the speed of movement thereof is automatically reduced due to loading of the springs. Accordingly, the vane piston travels at a variable speed, with the decelerations occurring adjacent the ends of its strokes and during reversal of its movement.

From the foregoing, it is manifest that the present invention provides a fluid motor particularly adapted to operate oscillatable windshield wiper blades. Moreover, the present invention provides fluid pressure means for maintaining the blades in the parked position when the wiper motor is not in operation.

While the embodiment of the present invention as herein disclosed, constitutes a preferred form, it is to be understood that other forms might be adopted.

What is claimed is as follows:

1. A fluid pressure motor including in combination, a cylinder, an oscillatable vane piston disposed in said cylinder and dividing the same into two chambers, said piston being capable of fluid pressure actuation in both directions, a spring biased plunger disposed in each cylinder chamber and engageable by said piston adjacent each end of its normal working stroke, said spring biased plungers reducing the abruptness of piston movement reversals, valve means operatively associated with said plungers and actuated by movement thereof for directing pressure fluid to opposite chambers of said cylinder so as to maintain said piston in a state of continuous oscillation, and means associated with one of said plungers for permitting movement of said piston beyond its normal working stroke and retaining the same in said position.

2. A fluid pressure motor including in combination, a cylinder, an oscillatable vane piston disposed in said cylinder and dividing the same into two chambers, said piston being capable of fluid pressure actuation in both directions, a spring biased plunger disposed in each cylinder chamber and engageable by said piston adjacent each end of its normal working stroke, said spring biased plungers reducing the abruptness of piston movement reversals, valve means operatively associated with said plungers and actuated by movement thereof for directing pressure fluid to opposite chambers of said cylinder so as to maintain said piston in a state of continuous oscillation, movable stop means associated with one of said plungers for permitting movement of said piston beyond its normal working stroke and retaining the same in said position, and manual means for moving said stop means to facilitate movement of said piston beyond its normal working stroke.

3. A fluid pressure motor including in combination, a cylinder, an oscillatable piston disposed in said cylinder capable of fluid pressure actuation in both directions, said piston dividing said cylinder into two chambers, a valve member disposed in each cylinder chamber and engageable by said piston so as to be moved thereby, a servo valve for controlling the application of pressure fluid to opposite chambers of said cylinder, said servo valve being operatively connected with said piston actuated valve members whereby the position of said servo valve is determined by said valve members, and means for latching said servo valve in position so as to prevent movement of said piston.

4. The combination set forth in claim 3 wherein said valve members comprise plungers which are spring biased so that the ends thereof project into the cylinder chambers whereby the abruptness of piston movement reversals is reduced.

5. A fluid pressure motor including in combination, a cylinder, an oscillatable piston disposed in said cylinder capable of fluid pressure actuation in both directions, said piston dividing said cylinder into two chambers, a valve member disposed in each cylinder chamber and engageable by said piston so as to be moved thereby, a servo valve for controlling the application of pressure fluid to opposite chambers of said cylinder, said servo valve being operatively connected with said piston actuated valve members whereby the position of said servo valve is determined by said valve members, and a manual control valve for controlling the speed of motor operation, said manual control valve including means operatively associated with one of said valve members for permitting extended movement thereof and simultaneously therewith latching the servo valve in position whereby the piston may be moved beyond its working stroke and into a parked position.

6. A fluid pressure motor including in combination, a cylinder, a movable member disposed in said cylinder capable of fluid pressure actuation in either direction and dividing said cylinder into two chambers, a plunger disposed in each cylinder chamber and engageable by said member adjacent each end of its normal working stroke, valve means operatively connected with said plungers and actuated by movement thereof for directing pressure to opposite chambers of said cylinder so as to maintain said member in a state of continuous movement, stop means engageable with one of said plungers for limiting movement thereof by said member, and manually operable means for displacing said stop means so as to permit extended movement of said one plunger by said member whereby said member may be moved beyond one end of its normal working stroke.

7. A fluid pressure motor including in combination, a cylinder, a piston disposed in said cylinder capable of fluid pressure actuation in either direction and dividing said cylinder into two chambers, a spring biased plunger disposed in each cylinder chamber and engageable by said piston adjacent each end of its normal working stroke, valve means operatively associated with said plungers and actuated by movement thereof for directing pressure fluid to opposite chambers of said cylinder so as to maintain said piston in a state of continuous movement, a spring biased stop member engageable with one of said plungers for limiting movement thereof by said piston, and manually operable means for displacing said stop member so as to permit extended movement of said one plunger by said piston whereby said piston may be moved beyond one end of its normal working stroke.

8. A fluid pressure motor including in combination, a cylinder, a piston disposed in said cylinder capable of fluid pressure actuation in either direction and dividing said cylinder into two chambers, a valve member disposed in each cylinder chamber and engageable by said piston so as to be moved thereby at each end of the normal working stroke of said piston, a servo valve for controlling the application of pressure fluid to opposite chambers of said cylinder, said servo valve being operatively connected with said piston actuated valve members whereby the position of said servo valve is determined by said valve members, stop means engageable with one of said valve members for limiting movement thereof by said piston, and manually operable means for displacing said stop means so as to permit extended movement of said one valve member by said piston whereby said piston may be moved beyond one end of its normal working stroke.

9. A fluid pressure motor including in combination, a cylinder, a piston disposed in said cylinder capable of fluid pressure actuation in either direction and dividing said cylinder into two chambers, a valve member disposed in each cylinder chamber and engageable by said piston so as to be moved thereby at each end of its normal working stroke of said piston, a servo valve for controlling the application of pressure fluid to opposite chambers of said cylinder, said servo valve being operatively connected with said piston actuated valve members whereby the position of said servo valve is determined by said valve members, a stop means engageable with one of said valve members for limiting movement thereof by said piston, manually operable means for displacing said stop means so as to permit extended movement of said one valve member by said piston whereby said piston may be moved beyond one end of its normal working stroke, and latch means carried by said manually operable means and engageable with said servo valve for preventing movement of said servo valve whereby said piston will come to rest in a parked position beyond said one end of its normal working stroke.

10. The combination set forth in claim 9 wherein said manually operable means comprises a reciprocable control valve, and wherein said motor includes a valve casing having a pair of interconnected parallel valve bores within which said servo valve and said control valve are disposed.

11. The combination set forth in claim 10 wherein said latch means comprises a pawl pivotally carried by said control valve, resilient means engaging said pawl for imparting pivotal movement thereto in a direction wherein an end of said pawl projects into the valve bore containing said servo valve so as to prevent movement thereof when said manual control valve is moved to the off position.

12. The combination set forth in claim 10 wherein said stop means comprises a spring biased member disposed in the valve bore containing said manual control valve, said stop member being engageable by said manual control valve and displaced thereby when said manual control valve is moved to the off position so as to permit extended movement of said one valve member.

References Cited in the file of this patent

UNITED STATES PATENTS

| | | |
|---|---|---|
| 393,596 | Westinghouse | Nov. 27, 1888 |
| 637,881 | Marsh | Nov. 28, 1899 |
| 917,092 | Miller et al. | Apr. 6, 1909 |
| 1,197,754 | Moehn | Sept. 12, 1916 |
| 1,199,526 | Bowser | Sept. 26, 1916 |
| 1,674,056 | Oishei et al. | June 19, 1928 |
| 1,880,727 | Blood | Oct. 4, 1932 |
| 2,161,216 | Wood | June 6, 1939 |
| 2,183,538 | Butler | Dec. 19, 1939 |
| 2,664,074 | O'Shei | Dec. 29, 1953 |